US009180806B2

(12) United States Patent
Schreiber et al.

(10) Patent No.: US 9,180,806 B2
(45) Date of Patent: Nov. 10, 2015

(54) CUP HOLDER FOR A MOTOR VEHICLE

(71) Applicant: GM GLOBAL TECHNOLOGY OPERATIONS LLC, Detroit, MI (US)

(72) Inventors: Michael Schreiber, Frankfurt am Main (DE); Wilhelm Sulzbacher, Mandel (DE); Michael Graf, Leun (DE); Marian Piskon, Wiesbaden (DE); Ralf Venino, Floersheim-Wicker (DE); Holger Thums, Bad Soden a. T (DE); Stephan Walter, Ringheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 38 days.

(21) Appl. No.: 14/061,060

(22) Filed: Oct. 23, 2013

(65) Prior Publication Data
US 2014/0138977 A1 May 22, 2014

(30) Foreign Application Priority Data

Oct. 23, 2012 (DE) .......................... 10 2012 020 753

(51) Int. Cl.
*B60N 3/00* (2006.01)
*B60N 3/10* (2006.01)
*B60R 7/04* (2006.01)

(52) U.S. Cl.
CPC ................ *B60N 3/102* (2013.01); *B60N 3/108* (2013.01); *B60R 7/04* (2013.01)

(58) Field of Classification Search
CPC ............ B60R 7/04; B60R 7/06; B60N 3/102; B60N 3/108
USPC .......................... 296/24.34, 37.8, 24.46, 37.9; 297/188.14, 188.9; 248/311.2; 224/926; 220/737, 740
See application file for complete search history.

(56) References Cited

U.S. PATENT DOCUMENTS

| 5,190,259 A | 3/1993 | Okazaki |
| 6,129,237 A | 10/2000 | Miyahara |
| 7,121,517 B2 | 10/2006 | Oana |

(Continued)

FOREIGN PATENT DOCUMENTS

| DE | 4421312 A1 | 10/1995 |
| DE | 102006003868 A1 | 8/2007 |

(Continued)

OTHER PUBLICATIONS

Great Britain Search Report for GB Application No. 1318456.9 dated Apr. 16, 2014.

(Continued)

*Primary Examiner* — Stephen Gordon
(74) *Attorney, Agent, or Firm* — Ingrassia Fisher & Lorenz PC

(57) ABSTRACT

A motor vehicle is provided with a cup holder incorporated into a center console, the cup holder including, but not limited to a front wall, a back wall, two side walls and a base wall, which delimit a receiving space for at least one object, a dividing element, able to be fastened at the upper end region of the receiving space in a dividing position, for dividing the receiving space into a first receiving compartment for a first object and into a second receiving compartment for a second object. The dividing element is constructed from a first part dividing element and a second part dividing element and the first and second part dividing elements are connected pivotably with one another by at least one intermediate joint.

16 Claims, 4 Drawing Sheets

(56) References Cited

U.S. PATENT DOCUMENTS

| | | |
|---|---|---|
| 8,480,151 B2 | 7/2013 | Gaudig et al. |
| 2006/0038101 A1 | 2/2006 | Oana |
| 2007/0051764 A1 | 3/2007 | Sturt et al. |
| 2009/0315356 A1* | 12/2009 | Stueber .................. 296/24.34 |
| 2011/0181007 A1 | 7/2011 | Caruso et al. |

FOREIGN PATENT DOCUMENTS

| | | |
|---|---|---|
| DE | 102007061203 A1 | 6/2009 |
| DE | 102009000972 A1 | 8/2010 |
| DE | 102010055355 A1 | 12/2011 |
| EP | 1854672 A2 | 11/2007 |
| GB | 2468564 A | 9/2010 |
| GB | 2471358 A | 12/2010 |
| JP | 20020040169 A | 5/2002 |
| JP | 2006001355 A | 1/2006 |
| JP | 2008239001 A | 10/2008 |
| WO | 2004024508 A2 | 3/2004 |

OTHER PUBLICATIONS

German Patent Office, German Patent Search Report for Application No. 102012020753.0, dated May 28, 2013.

* cited by examiner

CUP HOLDER FOR A MOTOR VEHICLE

CROSS-REFERENCE TO RELATED APPLICATION

This application claims priority to German Patent Application No. 10 2012 020 753.0, filed Oct. 23, 2012, which is incorporated herein by reference in its entirety.

TECHNICAL FIELD

The technical field relates to a cup holder for a motor vehicle.

BACKGROUND

Motor vehicles have, within an interior, vehicle seats to hold passengers. Between the two front seats generally a center console is constructed, which has a cup holder. The cup holder serves to receive various objects, for example a drink container, an ash container, a smartphone or for example also writing equipment, e.g., pens. The cup holder has a receiving space and it is already known here to divide the receiving space of the drink container with a dividing element into a first and a second receiving compartment.

The dividing element is arranged at an upper end region of the receiving space, so that thereby the receiving space has a first and second partial opening, respectively for receiving separate objects. Here, the dividing element can provide this function in the dividing position for dividing the receiving space into a first and a second receiving compartment, by the opening of the receiving space being divided by the dividing element into a first partial opening and into a second partial opening. On a removal of the dividing element from the dividing position, the receiving space has a large overall opening to receive at least one object.

From DE 10 2007 061 203 A1 a receiving element is known, in particular for a motor vehicle, with an upwardly open housing to receive at least one receptacle. The housing has a base and at least one lateral clamping element, and in the housing at least one foldable support is mounted, which in a first arrestable position is arranged parallel to and at a distance from the base and in a second position is arranged substantially perpendicular to the base, in addition the respective clamping element is arranged above the support, in relation to its first position.

In view of the foregoing, at least one object is making available a motor vehicle with a cup holder, in which a dividing element of the cup holder can be moved simply between a dividing position and a storage position and in the storage position the dividing element has a small extent. In addition, other objects, desirable features and characteristics will become apparent from the subsequent summary and detailed description, and the appended claims, taken in conjunction with the accompanying drawings and this background.

SUMMARY

A motor vehicle with a cup holder incorporated into a center console, the cup holder comprising a front wall, a back wall, two side walls and a base wall which delimit a receiving space for at least one object, a dividing element able to be fastened at the upper end region of the receiving space in a dividing position for dividing the receiving space into a first receiving compartment for a first object and into a second receiving compartment for a second object.

The dividing element is constructed from a first part dividing element and a second part dividing element, and the first and second part dividing elements are connected pivotably with one another by at least one intermediate joint. The dividing element has a first part dividing element and a second part dividing element with the at least one intermediate joint the first and second part dividing elements are pivotable with respect to one another about a pivot axis on the at least one intermediate joint. The two part dividing elements and/or the dividing element is constructed here substantially flat and by the pivoting of the two part dividing elements with respect to one another, these can be arranged one over another, so that thereby in a storage position of the dividing element the latter requires a smaller installation space owing to the arranging one over another of the first and second part dividing element. Expediently, the first and second part dividing element has substantially the same length, i.e., with a deviation of less than 30%, 20% or 10% the first and second part dividing element has the same length.

In particular, one part dividing element is pivotably connected by at least one connection joint with the remaining cup holder, in particular a front wall or a back wall. By means of the connection joint, the part dividing element can be pivoted about a pivot axis on the connection joint. The part dividing element which is connected with the at least one connection element is therefore pivotable about the pivot axis on the at least one connection element about substantially an acute angle or about substantially 90°. In the dividing position, the part dividing element, which is connected with the at least one connection element, is aligned substantially horizontally, and in the storage position the part dividing element, which is connected with the at least one connection joint, is aligned substantially vertically, i.e., aligned with a deviation of less than about 45°, about 30°, about 20° or about 10° to a vertical plane or straight line.

In a further embodiment, the front wall or back wall, with which the part dividing element is connected by the at least one connection joint, is aligned in an acute or obtuse angle to the substantially horizontally aligned base wall. The angle is determined at the receiving space, i.e., the angle is determined at the sides of the walls which delimit the receiving space. The part dividing element, which is connected by the at least one connection joint, lies preferably in the storage position on the front or back wall, with which the at least one connection joint is indirectly or directly connected. Thereby, the part dividing element has the same alignment with the at least one connection joint in the storage position as the front or back wall, with which the part dividing element is connected by the at least one connection joint. Thereby, in the storage position the dividing element can be arranged in a particularly space-saving manner within the receiving space of the cup holder.

In a another embodiment, the first and second part dividing elements are folded on one another by the least one connection joint in the storage position, so that in the storage position the first and second part dividing elements are aligned substantially parallel to one another and over one another. The first and second part dividing elements are arranged over one another in the storage position, so that these have particularly little installation space and in addition thereby the first and second part dividing elements have the same geometrical alignment.

Preferably, for moving the dividing element from the dividing position into the storage position, the first and second part dividing elements are pivotable to one another by the at least one intermediate joint, and with the at least one connection joint the first or second part dividing element, fastened to the connection joint, is pivotable from a substantially horizontal alignment to an alignment substantially parallel to the wall, in particular the front wall or the back wall, on which the at least one connection joint is arranged, and vice versa. In the dividing position, the first and second part dividing element is substantially horizontal, i.e., aligned with a deviation of less than about 30°, about 20° or about 10° parallel to a horizontal plane. In the storage position, the first and second part dividing element is arranged substantially parallel to the wall, in particular front or back wall, i.e., arranged with a deviation of less than about 30°, about 20° or about 10° parallel to the wall, in particular front or back wall, or aligned substantially parallel to a vertical plane.

In the dividing position, the dividing element can thereby serve for dividing the receiving space into the first and second receiving compartment and in the storage position the dividing element requires particularly little installation space, because on the one hand the first and second part dividing elements lie one over another and in addition the part dividing element which is connected with the connection joint, rests on the wall, in particular the front or back wall. Owing to the lying on one another of the two part dividing elements, these therefore require particularly little installation space in the storage position.

In a variant, the first and second part dividing elements in the dividing position are substantially parallel to one another and adjacent to one another and aligned in a plane and preferably substantially horizontally. The first and second part dividing elements as dividing element can thereby in the dividing position divide an opening of the receiving space into a first partial opening and into a second partial opening, so that thereby the receiving space is divided into a first receiving compartment and into a second receiving compartment.

Expediently, the first and second part dividing elements are constructed as two substantially U-shaped frame parts with in each case a transverse web and two longitudinal webs, and the longitudinal webs are connected with one another by intermediate joints. At the end region of the two longitudinal webs of each part dividing element, these are connected pivotably to one another by means in each case of an intermediate joint with respectively another longitudinal web of the other part dividing element. The intermediate joint can be constructed for example as a hinge or else as a film hinge.

In another embodiment, owing to the geometry of the dividing element in the dividing position, the dividing element has a first partial opening and a second partial opening, and between the first partial opening and the second partial opening the width of the opening is smaller than at the first partial opening and at the second partial opening, or the first and second partial openings are constructed as separate partial openings. The width of the opening between the two partial openings is smaller than at the first and second partial opening, i.e., preferably by at least about 40%, about 30% or about 10% smaller than at the first and second partial opening. When the first and second partial openings are constructed as separate partial openings, a transverse web is formed between the first and second partial opening, so that thereby the first and second partial openings are completely separated from one another.

In particular, at the end region of the longitudinal webs of the first and second part dividing element in each case a flexible, preferably U-shaped, rubber lip is constructed, so that in the dividing position the dividing element has an opening in which at the two rubber lips the opening has a smaller width than outside the two rubber lips for dividing the receiving space into a first receiving compartment for a first object and into a second receiving compartment for a second object and for forming the first and second partial opening. The rubber lip is arranged at the end region of the longitudinal webs and thereby the opening between the two partial openings at the rubber lip has a smaller width than at the first and second partial opening. The rubber lip is pivotable or respectively flexible here, so that it can also carry out a pivoting movement of the first and second part dividing elements with respect to one another.

In a further embodiment, the first receiving compartment serves to receive a drink container and in the second receiving compartment an ash container is arranged. The first and second receiving compartments can serve to receive different objects. For example, by arrangement of an ash container, ash can be received by the ash container in the first or second receiving compartment. By a removal of the ash container, another object, for example a smartphone, can be arranged in the first and second receiving compartment. Different objects, i.e., for example a drink container, an ash container, a pen, a smartphone or else a small writing pad can be arranged in the cup holder.

In a supplementary variant, in the storage position of the dividing element the receiving space has no division into the first and second receiving compartment, so that the entire receiving space is available to receive at least one object without division, and/or the width of the receiving space is substantially constant at the upper end region. In the storage position of the dividing element, the opening of the receiving space has a substantially constant width, i.e., is constant with a deviation of less than about 30%, about 20%, about 10% or about 5%, so that thereby the entire receiving space of the cup holder serves to receive at least one object and is not divided into two receiving compartments by the two partial openings.

In a further variant, the upper end region of the receiving space comprises the upper about 30%, about 20% or about 10% of the vertical extent of the receiving space. The dividing element can be arranged in the dividing position also slightly above an upper end of the front, back or side wall, i.e., for example above about 30%, about 20% or about 10% of the vertical extent of the front, back or side wall.

In a further embodiment, the cup holder has at least partially, in particular completely, of plastic. Expediently, the connection joint and/or the intermediate joint can be constructed from metal. In particular, the cup holder has a closure element, in particular a roller shutter, for opening and closing the receiving space, by the closure element being movable between an open position and a closed position and vice versa. The closure element, for example the roller shutter or a flap, can be moved between the open position and the closed position, and in the closed position the receiving space is closed at the upper end region, and in the open position the receiving space is opened for the removal and receiving of objects.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 5:
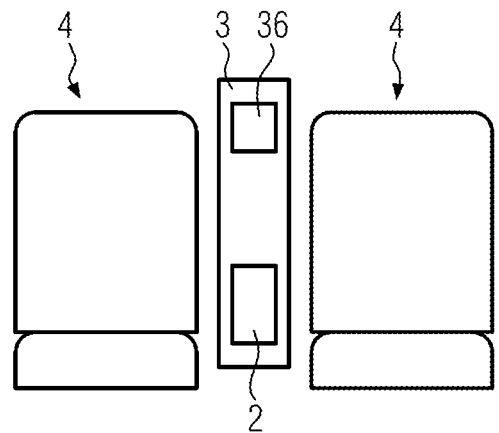
FIG. 5 is a top view of two front seats and of a center console with the cup holder.
Figure 6:
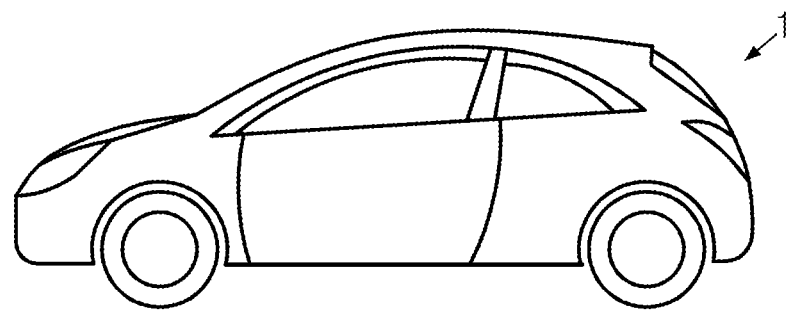
FIG. 6 is a side view of a motor vehicle.

A motor vehicle 1 illustrated in FIG. 6 has as drive motor an electric and/or combustion chamber. Within an interior, which is not illustrated, the motor vehicle 1 has two front seats 4 and three rear seats (not illustrated). The rear seats are constructed here as a rear bench seat. Between the two front seats 4 a center console 3 is present (FIG. 5). A cup holder 2 is incorporated or respectively integrated into the center console 3 and in addition the center console 3 has further functional elements, for example a gear lever 36 or a handbrake (not illustrated) and/or a shelf. The cup holder 2 is integrated into the center console 3 such that an upper end region of the cup holder 2 with a roller shutter 30 as closure element 29 terminates substantially flush with the upper end region of the center console 3.

The center console 3 of plastic has a front wall 5, a back wall 6, two side walls 7 and a base wall 8, so that a receiving space 9 for receiving objects is delimited by the front wall 5, the back wall 6, the two side walls 7 and the base wall 8. The back wall 6 and the two side walls 7 are aligned substantially vertically, and the front wall 5 is aligned at an acute angle of approximately 70° to an imaginary plane spanned from the base wall 8. At the receiving space 9, the front wall 5 is aligned to the base wall 8 at an angle of approximately 110°.

At the two side walls 7 on the inner side respectively two support elements 33 are constructed for supporting a dividing element 10. The dividing element 10 comprises a first part dividing element 13 and a second part dividing element 14. The first and second part dividing elements 13, 14 have in each case a transverse web 20 and two longitudinal webs 21, which thereby form a frame part 19. At the end region of the longitudinal webs 21, these are connected by means of an intermediate joint 23, so that the first and second part dividing elements 13, 14 are pivotable with respect to one another the two intermediate joints 23 respectively at the longitudinal webs 21 about a pivot axis 24 on the intermediate joint 23. The pivot axis 24 is aligned here substantially horizontally and in transverse direction of the motor vehicle 1. The first part dividing element 13 is connected additionally by two connection joints 25 indirectly or directly with the front wall 5. The first part dividing element 13 is thereby pivotable about a pivot axis 26 through the connection joint 25. The pivot axis 26 is aligned substantially horizontally and in transverse direction of the motor vehicle 1.

Figure 1:
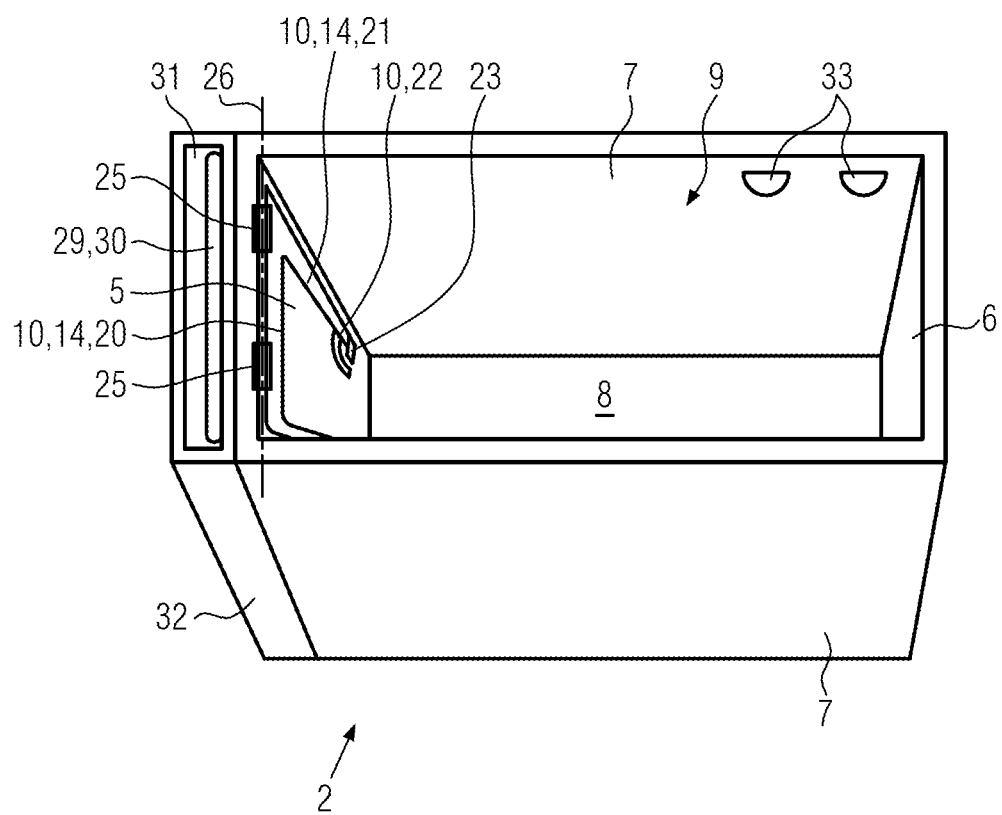
FIG. 1 is a perspective view of a cup holder with a dividing element in a storage position.

In FIG. 1 a storage position of the dividing element 10 is illustrated, and in FIG. 12 a dividing position of the dividing element 10. In the dividing position of the dividing element 10 illustrated in FIG. 2, the second dividing element 14 lies at the two longitudinal webs 21 on the support elements 33 on the two side walls 7. Owing to the perspective illustration in FIG. 1, the support elements 33 are only visible on one side wall 7. At the end region of the longitudinal webs 21 of the first and second part dividing elements 13, 14, these are connected with one another by means of a rubber lip 22, so that thereby an opening of the receiving element 9 is divided by the dividing element 10 into a first partial opening 15 at the first part dividing element 13 and into a second partial opening 16 at the second part dividing element 14.

The width of the opening of the receiving space 9 between the two partial openings 15, 16 at the rubber lip 22 is smaller than at the two partial openings 15, 16. The width 18 of the opening of the receiving space 9 at the two rubber lips 22 is smaller than the width 17 outside the rubber lips 22 at the first and second partial opening 15, 16. Thereby, the receiving space 9 is divided into a first receiving compartment 11 and into a second receiving compartment 12. Different objects 27, 28 can be introduced and received into the two receiving compartments 11, 12 separately by the first and second partial opening 15, 16. For example, a drink container 27 can be arranged in the first receiving compartment 11, and an ash container 28 in the second receiving compartment 12. The two connection joints 25 and the support elements 33 have the substantially identical distance from the horizontally aligned base wall 8, so that thereby the dividing element 10 is aligned substantially horizontally with the first and second part dividing element 13, 14 in the dividing position. The two first and second part dividing elements 13, 14 are therefore, in the dividing position illustrated in FIG. 2, arranged adjacent to one another and in the same imaginary and substantially horizontally aligned plane.

For moving the dividing element 10 from the dividing position illustrated in FIG. 2 into the storage position illustrated in FIG. 1, the second part dividing element 14 can be raised with a handhold 34 on the upper side on the second part dividing element 14 (FIG. 2), and subsequently the second part dividing element 14 can be pivoted about the pivot axis 24 with the two intermediate joints 23 relative to the first part dividing element 14, so that thereby the upper sides of the first and second part dividing element 13, 14, illustrated in FIG. 2, lie on one another and at the same time the first part dividing element 13 is pivoted about the pivot axis 26 on the connection joint 25 from the horizontal alignment according to FIG. 2 into an alignment about substantially 70°, so that thereby the underside of the first part dividing element 13, not visible in FIG. 2, rests on the front wall 5.

Figure 2:
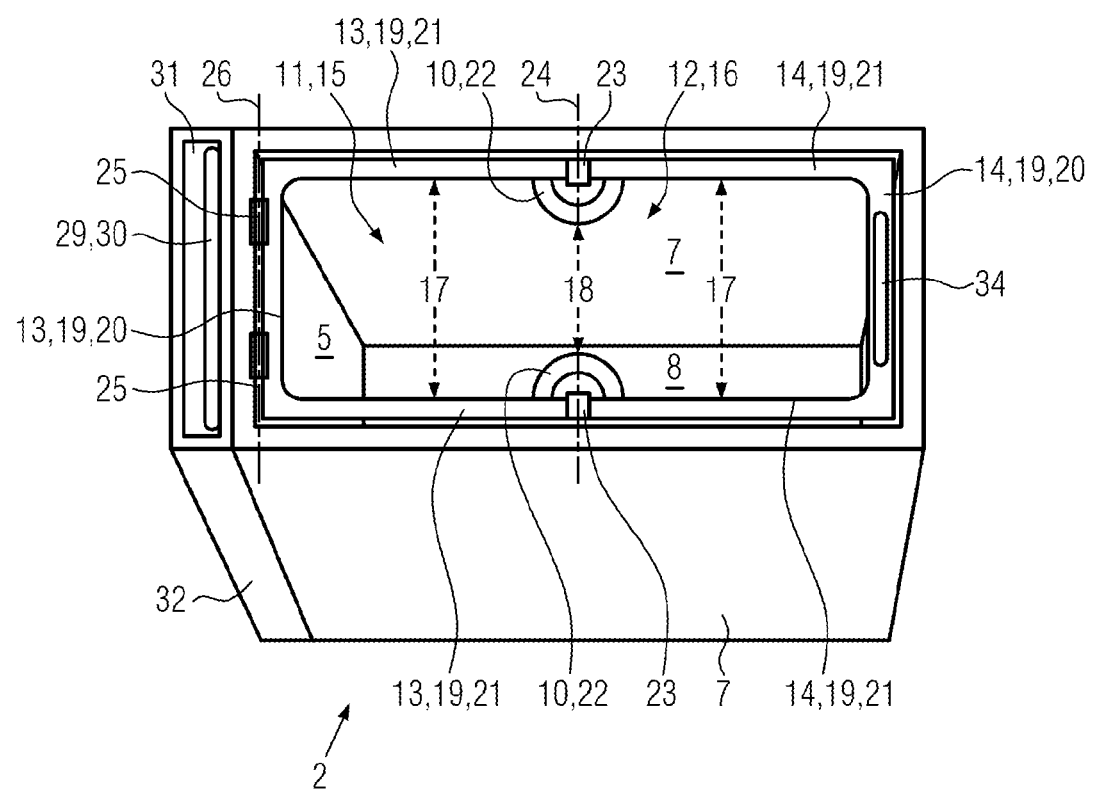
FIG. 2 is a perspective view of the cup holder according to FIG. 1 with the dividing element in a dividing position.

In the storage position illustrated in FIG. 1 therefore the first part dividing element 13 lies with the underside, not illustrated in FIG. 2, on the front wall 5, and the upper side of the second part dividing element 14, illustrated and visible in FIG. 2, lies on the upper side of the first part dividing element 13, visible in FIG. 2. Owing to the visibility and elasticity of the rubber lip 22, this can be deformed accordingly during the pivoting of the two part dividing elements 13, 14 with respect to one another. For moving the dividing element 13 from the storage position illustrated in FIG. 1 into the dividing position illustrated in FIG. 2, the corresponding movement sequence as described above is to be repeated in reverse.

Figure 3:
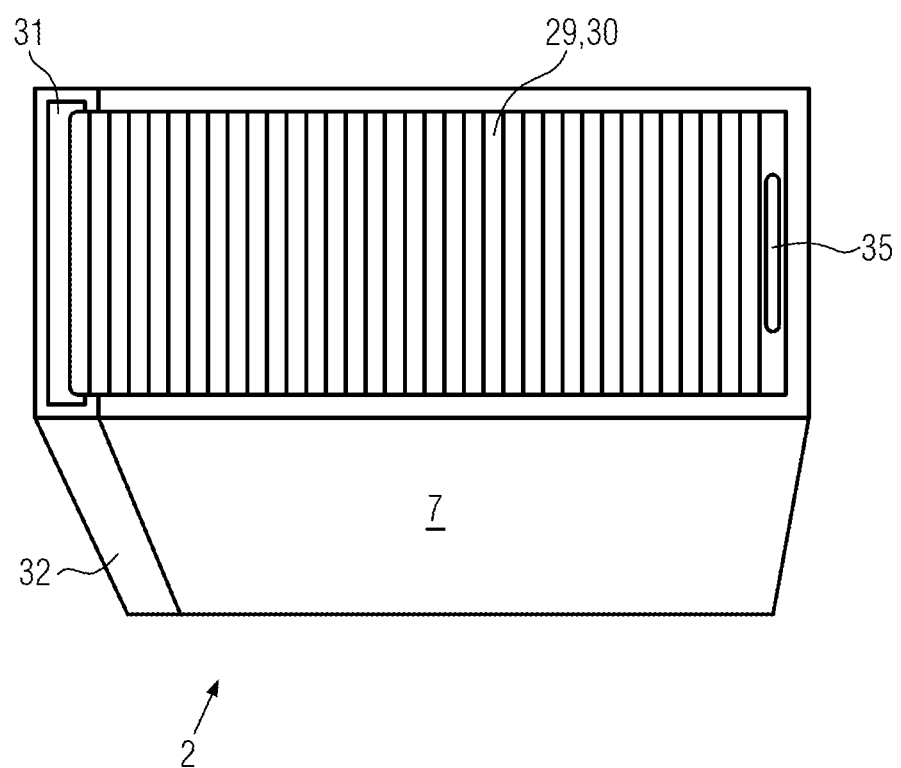
FIG. 3 is a perspective view of the cup holder with a roller shutter in a closed position.
Figure 4:
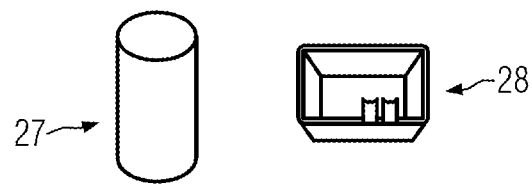
FIG. 4 is a perspective view of a drink container and of an ash container.

For the complete closure of the receiving space 9, the cup holder 2 has a closure element 29 as a roller shutter 30. The roller shutter 30 is arranged in FIG. 1 and FIG. 2 substantially completely inside a storage box 32 on the rear side on the front wall 5. For closing the receiving space 9 with the roller shutter 30, the latter can be moved through a slit 31 on the storage box 32 out from the latter, until the roller shutter 30 is situated in the closed position illustrated in FIG. 3. The moving of the roller shutter 30 can be carried out with a handhold 35 on the upper side on the roller shutter 30. Here, roller shutter 30 is guided on the inner side in a groove, which is not illustrated, in the upper end region of the two side walls 7.

Viewed as a whole, essential advantages are connected with the motor vehicle 1 according to the invention. The cup holder 2, which is incorporated or respectively integrated into the center console 3, can be divided with the dividing element 10 in the dividing position simply into the first and second receiving compartment 11, 12. In so far as such a division is not desired, in the storage position of the dividing element 10 illustrated in FIG. 1, the entire receiving space 9 is available without such a division. In the storage position, in an advantageous manner the dividing element 10 requires less installation space and in addition it is permanently, preferably non-detachably, also connected with the cup holder 2 in the storage position, so that the dividing element 10 cannot become lost in the everyday use of the motor vehicle 1.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A motor vehicle with a cup holder incorporated into a center console, the cup holder, comprising:
    a front wall, a back wall, two side walls and a base wall, which delimit a receiving space for at least one object; and
    a dividing element that is configured to fasten at an upper end region of the receiving space in a dividing position for dividing the receiving space into a first receiving compartment for a first object and a second receiving compartment for a second object, the dividing element constructed from a first part dividing element and a second part dividing element, and the first part dividing element and the second part dividing element are pivotably connected by intermediate joints,
    wherein the first part dividing element and the second part dividing element are constructed as two substantially U-shaped frame parts with a transverse web and two longitudinal webs and the longitudinal webs are connected with one another by the intermediate joints.

2. The motor vehicle according to claim 1, wherein the first part dividing element is pivotably connected by at least one connection joint with the cup holder.

3. The motor vehicle according to claim 2, wherein the front wall with which the first part dividing element is connected by the at least one connection joint is aligned at an angle to the base wall.

4. The motor vehicle according to claim 1, wherein the first part dividing element and the second part dividing element are folded on one another in a storage position by at least one connection joint so that in the storage position the first part dividing element and the second part dividing element are aligned substantially parallel to one another and over one another.

5. The motor vehicle according to claim 1, wherein the first part dividing element and the second part dividing element are pivotable to one another by the intermediate joints for moving the dividing element from the dividing position into a storage position, and
    wherein by at least one connection joint the first part dividing element fastened to the at least one connection joint is pivotable from a substantially horizontal alignment to an alignment substantially parallel to at least the back wall.

6. The motor vehicle according to claim 1, wherein the first part dividing element and the second part dividing element in the dividing position are substantially parallel to one another and adjacent to one another and aligned in a plane.

7. The motor vehicle according to claim 1, wherein the upper end region of the receiving space comprises the upper 10% of a vertical extent of the receiving space.

8. The motor vehicle according to claim 1, wherein the dividing element has a first partial opening and a second partial opening, and between the first partial opening and the second partial opening a width of an opening defined between the first partial opening and the second partial opening is smaller than a second width at the first partial opening and a third width at the second partial opening.

9. The motor vehicle according to claim 8,
    wherein at an end region of the two longitudinal webs of the first part dividing element and the second part dividing element a flexible, U-shaped, rubber lip is constructed, so that in a dividing position the dividing element has an opening for dividing the receiving space into the first receiving compartment for a first object and into the second receiving compartment for a second object and for the construction of the first partial opening and the second partial opening.

10. The motor vehicle according to claim 1, wherein the first receiving compartment serves to receive a drink container and an ash container is arranged in the second receiving compartment.

11. The motor vehicle according to claim 1, wherein in a storage position of the dividing element the receiving space has substantially no division into the first receiving compartment and the second receiving compartment so that the receiving space is available without division to receive at least one object.

12. The motor vehicle according to claim 1, wherein the upper end region of the receiving space comprises the upper 30% of a vertical extent of the receiving space.

13. The motor vehicle according to claim 1, wherein the cup holder is at least partially plastic.

14. The motor vehicle according to claim 1, wherein cup holder has a closure element movable between an open position and a closed position for opening and closing the receiving space.

15. The motor vehicle according to claim 1, wherein the front wall, with which the first part dividing element is connected by at least one connection joint, is aligned at an acute or obtuse angle to the base wall.

16. The motor vehicle according to claim 1, wherein the upper end region of the receiving space comprises the upper 20% of a vertical extent of the receiving space.

* * * * *